(12) United States Patent
Yang et al.

(10) Patent No.: US 9,988,009 B2
(45) Date of Patent: Jun. 5, 2018

(54) SEPARATED ANTI-COLLISION CAR

(71) Applicant: Guan Yang, Zhenjiang, Jiangsu (CN)

(72) Inventors: Guan Yang, Jiangsu (CN); Ju Yang, Jiangsu (CN)

(73) Assignee: Guan Yang, Zhenjiang, Jiangsu (CN)

( * ) Notice: Subject to any disclaimer, the term of this patent is extended or adjusted under 35 U.S.C. 154(b) by 0 days. days.

(21) Appl. No.: 15/541,957

(22) PCT Filed: Sep. 17, 2015

(86) PCT No.: PCT/CN2015/089882
§ 371 (c)(1),
(2) Date: Jul. 6, 2017

(87) PCT Pub. No.: WO2016/169199
PCT Pub. Date: Oct. 27, 2016

(65) Prior Publication Data
US 2018/0001854 A1 Jan. 4, 2018

(30) Foreign Application Priority Data
Apr. 24, 2015 (CN) .......................... 2015 1 0198998

(51) Int. Cl.
*B62D 24/04* (2006.01)
*B60R 21/02* (2006.01)

(52) U.S. Cl.
CPC .............. *B60R 21/02* (2013.01); *B62D 24/04* (2013.01)

(58) Field of Classification Search
CPC ................................ B62D 24/04; B60R 21/02
USPC ................................. 296/35.1–35.3; 180/274
See application file for complete search history.

(56) References Cited

U.S. PATENT DOCUMENTS 3,162,479 A * 12/1964 Hewitt .................. B62D 39/00
  180/271
3,423,124 A * 1/1969 Hewitt ................. B60N 2/4221
  296/35.2
3,479,080 A * 11/1969 Hilfiker .................... B62D 1/19
  180/89.1

(Continued)

FOREIGN PATENT DOCUMENTS

| CN | 1693117 | 11/2005 |
| CN | 2745831 | 12/2005 |

(Continued)

OTHER PUBLICATIONS

International Search Report filed in PCT/CN2015/089882 dated Jan. 12, 2016.

*Primary Examiner* — Gregory A Blankenship
(74) *Attorney, Agent, or Firm* — Rankin, Hill & Clark LLP

(57) ABSTRACT

A separated anti-collision car includes a frame and an independent passenger cabin, wherein the independent passenger cabin is arranged on the frame separately, a connected part between a front part of the independent passenger cabin and the frame is provided with a wedge-shaped slope mutually matched with the two, the slope is provided with a damping supporting rod separating the independent passenger cabin from the frame during collision, one end of the damping supporting rod is fixed on the frame, and the other end is connected to the independent passenger cabin; and a back part of the independent passenger cabin is hinged with the frame through an elastic expansion rod.

3 Claims, 2 Drawing Sheets

(56) References Cited

U.S. PATENT DOCUMENTS

| | | | | |
|---|---|---|---|---|
| 3,508,783 A * | 4/1970 | Schlanger | ............... | B62D 39/00 293/117 |
| 3,695,629 A * | 10/1972 | Schlanger | ............... | B60R 19/02 180/274 |
| 3,743,347 A * | 7/1973 | Shaw | ............... | B62D 39/00 296/35.2 |
| 3,806,184 A * | 4/1974 | Dean | ............... | B60G 99/002 293/1 |
| 3,831,998 A * | 8/1974 | Hewitt | ............... | B62D 1/19 180/271 |
| 3,837,422 A * | 9/1974 | Schlanger | ............... | B62D 39/00 180/274 |
| 4,826,209 A * | 5/1989 | Farris | ............... | B62D 39/00 180/274 |
| 5,251,911 A * | 10/1993 | Blake | ............... | B62D 39/00 180/274 |
| 5,738,378 A * | 4/1998 | Yazejian | ............... | B62D 39/00 180/232 |
| 5,915,775 A * | 6/1999 | Martin | ............... | B62D 24/02 296/187.12 |
| 6,464,275 B2 * | 10/2002 | Laurent | ............... | B62D 39/00 180/274 |
| 7,185,934 B2 * | 3/2007 | Saeki | ............... | B62D 39/00 296/35.2 |
| 7,721,837 B1 * | 5/2010 | DeVeau | ............... | B62D 39/00 180/274 |
| 2007/0035148 A1 * | 2/2007 | Ellenrieder | ............... | B62D 21/15 296/35.1 |
| 2017/0225724 A1 * | 8/2017 | Andersen | ............... | B62D 39/00 |
| 2018/0001854 A1 * | 1/2018 | Yang | ............... | B60R 21/02 |

FOREIGN PATENT DOCUMENTS

| | | |
|---|---|---|
| CN | 203450075 | 2/2014 |
| CN | 104786971 | 7/2015 |
| CN | 204548004 | 8/2015 |
| DE | 29809358 | 1/1999 |
| DE | 19817992 | 12/1999 |
| GB | 1332025 | 10/1973 |

* cited by examiner

US 9,988,009 B2

SEPARATED ANTI-COLLISION CAR

TECHNICAL FIELD

The present invention relates to a car, and particularly, to a separated anti-collision car.

BACKGROUND

With the rapid development of global economic technology, the popularizing rate of cars is greatly increased. However, the traffic casualty accidents caused correspondingly are also greatly increased. The safety of the car has been a main index to measure the value of the car. Specially, the anti-collision performance (frontal collision) is even the important guarantee of the safety of the car. At present, the collision safety system of the car with mature configuration is mainly composed of a safety belt and a supplementary restraint system, which increases the protection ability to the driver and passenger to a certain extent. However, the current car collision standard is basically measured according to a condition of about 80 km/h speed per hour, but the speed per hour of most injury accidents caused by collision is actually more than 80 km/h. Therefore, the practicability of the anti-collision index is very limited. Consequently, a challenge on the safety of the collision at the speed per hour of more than 80 km/h is presented.

Data shows that, collision injury of the car mainly has two types: one is the injury caused by severe transformation of the car body under the impact of an external force, which hits against and squeezes the bodies of the driver and passenger; and the other is that the speed of the car in a high-velocity motion is reduced to zero in a relatively short period and in a condition of rest after collision, so as to generate a huge accelerated speed, which leads to viscera damage of the human body to cause the death.

SUMMARY

In order to overcome the problem of the prior art, an object of the present invention is to provide a split anti-collision, which can be adopted to greatly increase the anti-collision safety of the car and protect the human body from being injured.

The object of the present invention is achieved through the following technical solutions.

A separated anti-collision car comprises a frame and an independent passenger cabin, wherein the independent passenger cabin is arranged on the frame separately, a connected part between a front part of the independent passenger cabin and the frame is provided with a wedge-shaped slope mutually matched with the two, the slope is provided with a damping supporting rod separating the independent passenger cabin from the frame during collision, one end of the damping supporting rod is fixed on the frame, and the other end is connected to the independent passenger cabin; and a back part of the independent passenger cabin is hinged with the frame through an elastic expansion rod.

In the present invention, an end of the damping supporting rod is fixed on the frame and is located on an upper end of the wedge-shaped slope; and the other end of the damping supporting rod is connected to a bottom end of the wedge-shaped slope at the front part of the independent passenger cabin. A locking device is arranged between the frame and the independent passenger cabin and mutually matched with the two.

The present invention is considered as two parts while designing the car body, i.e., the car is divided into two independent parts comprising the passenger cabin and the frame. The passenger cabin and the frame are closely connected into a whole through a locking system under a normal condition, so as to guarantee that no vibration and noise are caused during driving. Once collision occurs, the locking system is opened automatically, so that the passenger cabin and the frame are converted into a separable state. The passenger cabin firstly generates an upward thrust under the extrusion of the wedge-shaped connected part of a front engine part, and then the passenger cabin rotates in a longitudinal plane with an elastic connected point between the passenger cabin and the rear frame as an axis under the effect of initial kinetic energy. In order to prevent the front part of the passenger cabin from going up too quickly, a follow-up damping supporting rod is arranged between the lower side of the front end of the passenger cabin and the frame for buffering the rising velocity of the front end, which may fall back slowly after the front end of the passenger cabin rises to a limit height. Through the system above, when the car is collided, there is still much time to gradually decrease the speed of the passenger cabin, so as to greatly reduce the huge accelerated speed suffered by the driver and the passenger. Meanwhile, since the passenger cabin gets out of a squeezed state on a horizontal direction early, the person in the cabin is avoided from mechanical injury, and the combined action of the original air sacs and safety belt can basically ensure that the driver and the passenger can be prevented from injury. Moreover, since the passenger cabin is basically kept in good condition, the person in the cabin may leave quickly after collision to avoid injury of secondary disaster (such as fire and explosion).

The present invention aims at two types of injuries caused by car collision. Firstly, a wedge-shaped connecting design between the engine part and the passenger cabin firstly guarantees that the transformation of a car head may generates an upward thrust to push the passenger cabin to upward side instead of delivering to the passenger cabin during collision to lead to the transformation of the passenger cabin. Secondly, since the absorbed energy and transformation of the car head are very limited during collision, and the period is very short, even if the mechanical injury is avoided, the huge accelerated speed may also lead to injury. Therefore, the present invention fully uses the limited space above the engine of the car head to extend the deceleration time of the passenger cabin to the utmost extent, and convert the accelerated speed on the horizontal direction directly suffered by the person in the cabin into centripetal acceleration on the vertical direction, so that the accelerated speed suffered by the human body is greatly reduced, which may be known from a theoretical formula of accelerated speed. For an object in a high-velocity motion, the acceleration magnitude will be greatly reduced the time is increased by 0.5 Se in the process of deceleration to a static state. However, the accelerated speed which can be borne by the human body shall be no more than 10 g. Thus it can be seen that, if the decelerated time reaches to 1 S, the accelerated speed borne by the human body is 3.4 g, which can be borne by the human body safely, and then it is safe.

The present invention has the advantages and technical features as follows.

1. The present invention is designed based on the original car structure and safety system, which does not change the structure and the appearance of the car, and only separates the passenger cabin and a chassis at a combined part between the passenger cabin and the engine. Therefore, the technology is simple, and the increased cost is limited.

2. The passenger cabin is processed as an independent entirety. The passenger cabin may be squeezed upwardly under the wedge-shaped effect at the connected part between the passenger cabin and the engine during collision instead of leading to deformation of the passenger cabin, so as to prevent the person from suffering mechanical injury caused by the deformation of the passenger cabin during collision. Meanwhile, since the passenger cabin may not be deformed, which guarantees that the person can leave the passenger cabin in case of danger, so as to avoid suffering secondary disaster (fire hazard, explosion and collision of other cars) caused by collision.

3. Both the back side and the front side of the passenger cabin are provided with elastic damping rods and other devices to guarantee the separation of the passenger cabin and the uniformity and stability while falling back, so as to guarantee the safety of person to the utmost extent.

4. None transmission oil-ways and mechanical drive parts of the passenger cabin, the chassis and the engine are in a whole. Safe separation processing for emergency may be conducted on the connected part between the passenger cabin and the engine and the chassis, so as to avoid the obstruction during the separation process of the passenger cabin, and the leakage after separation, so as to guarantee the safety.

DETAILED DESCRIPTION

Figure 1:
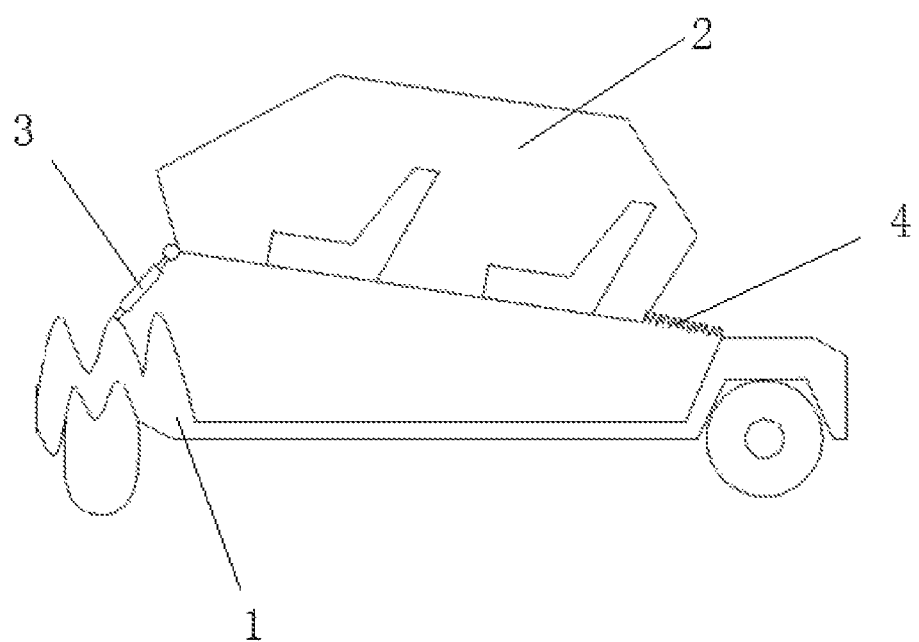
FIG. 1 is a structural diagram of the present invention under a deformation state after collision.
Figure 2:
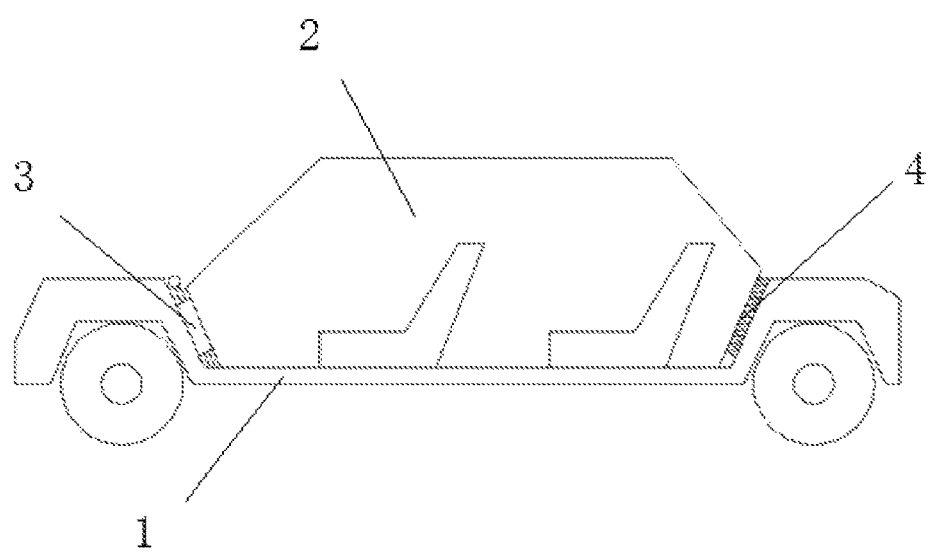
FIG. 2 is a structural diagram of the present invention under a normal driving state.

A separated anti-collision car comprises a frame 1 and an independent passenger cabin 2, wherein the independent passenger cabin are arranged on the frame separately, a connected part between a front part of the independent passenger cabin and the frame are provided with a wedge-shaped slope mutually matched with the two, the slope is provided with a damping supporting rod 3 separating the independent passenger cabin from the frame during collision, one end of the damping supporting rod is fixed on the frame, and the other end is connected to the independent passenger cabin; and a back part of the independent passenger cabin is hinged with the frame through an elastic expansion rod 4. One end of the damping supporting rod is fixed on the frame and is located on an upper end of the wedge-shaped slope; and the other end of the damping supporting rod is connected to a bottom end of the wedge-shaped slope at the front part of the independent passenger cabin. A locking device is arranged between the frame and the independent passenger cabin and mutually matched with the two. The elastic expansion rod may be a spring.

The passenger cabin and the frame are closely communicated into a whole through a locking system under normal condition, so as to guarantee that no vibration and noise are caused during driving. The locking system may be an openable multi-point clenching system. Once collision occurs, the locking system is opened automatically, so that the passenger cabin is separated from the frame. The passenger cabin firstly generates an upward thrust under the extrusion of the wedge-shaped connected part of a front engine part, and then the passenger cabin rotates in a longitudinal plane with an elastic connected point between the passenger cabin and the rear frame as an axis under the effect of initial kinetic energy. In order to prevent the front part of the passenger cabin from going up too quickly, a follow-up damping supporting rod is arranged between the lower side of the front end of the passenger cabin and the frame for buffering the rising velocity of the front end, which may fall back slowly after the front end of the passenger cabin rises to a limit height. Through the system above, when the car is collided, there is still much time to gradually decrease the speed of the passenger cabin, so as to greatly reduce the huge accelerated speed suffered by the driver and the passenger. Meanwhile, since the passenger cabin gets out of a squeezed state on a horizontal direction early, the person in the cabin is avoided from mechanical injury, and the combined action of the original air sacs and safety belt can basically ensure that the driver and the passenger can be prevented from injury. Moreover, since the passenger cabin is basically kept in good condition, the person in the cabin may leave quickly after collision to avoid injury of secondary disaster (such as fire and explosion).

The invention claimed is:

1. A separated anti-collision car, comprising a frame and an independent passenger cabin, wherein the independent passenger cabin is arranged on the frame separately, a connected part between a front part of the independent passenger cabin and the frame is provided with a wedge-shaped slope mutually matched with the frame and the independent passenger cabin, the wedge-shaped slope is provided with a damping supporting rod separating the independent passenger cabin from the frame during collision, one end of the damping supporting rod is fixed on the frame, and the other end is connected to the independent passenger cabin; and a back part of the independent passenger cabin is hinged with the frame through an elastic expansion rod, wherein one end of the damping supporting rod is fixed on the frame and is located on an upper end of the wedge-shaped slope; and the other end of the damping supporting rod is connected to a bottom end of the wedge-shaped slope at the front part of the independent passenger cabin.

2. The separated anti-collision car according to claim 1, wherein a locking device is arranged between the frame and the independent passenger cabin and mutually matched with the frame and the independent passenger cabin.

3. The separated anti-collision car according to claim 1, wherein the elastic expansion rod is a spring.

* * * * *